United States Patent
Tan et al.

(10) Patent No.: US 8,041,524 B2
(45) Date of Patent: Oct. 18, 2011

(54) METHOD OF POWER FACTOR CORRECTION

(75) Inventors: Allen Y. Tan, Taipei (TW); H.P. Yee, Taipei (TW)

(73) Assignee: Sync Power Corp., Taipei (TW)

( * ) Notice: Subject to any disclaimer, the term of this patent is extended or adjusted under 35 U.S.C. 154(b) by 372 days.

(21) Appl. No.: 12/354,164

(22) Filed: Jan. 15, 2009

(65) Prior Publication Data
US 2009/0243561 A1    Oct. 1, 2009

Related U.S. Application Data

(63) Continuation-in-part of application No. 11/434,771, filed on May 17, 2006, now abandoned.

(51) Int. Cl.
*G05F 1/70* (2006.01)
*G06F 17/00* (2006.01)

(52) U.S. Cl. ........... 702/64; 702/60; 702/72; 702/79; 700/293; 700/294

(58) Field of Classification Search .......... 702/64, 702/60, 72, 106, 79, 78
See application file for complete search history.

(56) References Cited

U.S. PATENT DOCUMENTS

| | | | |
|---|---|---|---|
| 4,352,156 A * | 9/1982 | Gyugyi | 363/163 |
| 6,232,964 B1 * | 5/2001 | Lee | 345/212 |
| 7,256,569 B2 * | 8/2007 | Wu et al. | 323/222 |
| 7,317,625 B2 * | 1/2008 | Zhang et al. | 363/89 |

* cited by examiner

*Primary Examiner* — Hal Wachsman
(74) *Attorney, Agent, or Firm* — Rosenberg, Klein & Lee (57) ABSTRACT

A method of power factor correction without using current sensing or a multiplier is disclosed. A generated predictive pulse is used to charge and discharge a power factor correction (PFC) inductor so that the current in the PFC inductor has a similar phase angle as the input AC voltage. Each ON portion of the pulse is used for charging while each OFF portion is used for discharging. As the input voltage increases in phase, the predictive pulse gradually increases in ON time duty and the PFC inductor is charged in increasing amount and discharged in decreasing amount per pulse. When peak is reached the duty ratio is reduced each pulse and the PFC inductor current is reduced along with the input AC voltage source until phase angle reaches 180 degrees and the ON time becomes zero.

33 Claims, 8 Drawing Sheets

METHOD OF POWER FACTOR CORRECTION

REFERENCE TO RELATED APPLICATIONS

This Patent Application has been filed as a Continuation-in-Part of patent application Ser. No. 11/434,771, filed 17 May 2006, now abandoned.

BACKGROUND OF THE INVENTION

1. Field of the Invention

The present invention relates to a power supply. More specifically, the present invention discloses a method of power factor correction without using current sensing or a multiplier by using a generated predictive pulse to charge and discharge the power factor correction (PFC) inductor.

2. Description of the Prior Art

A conventional power factor correction PFC technique is to have the power supply input resemble a resistor. This is achieved by programming the input current in response to the input voltage. With an in phase relationship between the voltage and the current the input will be resistive. This provides a power factor equal to one.

However, distortion or phase displacement in the input can occur if the ratio is not constant. Distortion or phase displacement will negatively affect the power quality.

The conventional method of power factor correction increases the power factor to ensure that the phase angle between the current and the voltage approaches zero. Unfortunately, this technique is not always achievable in practice.

Figure 1A:
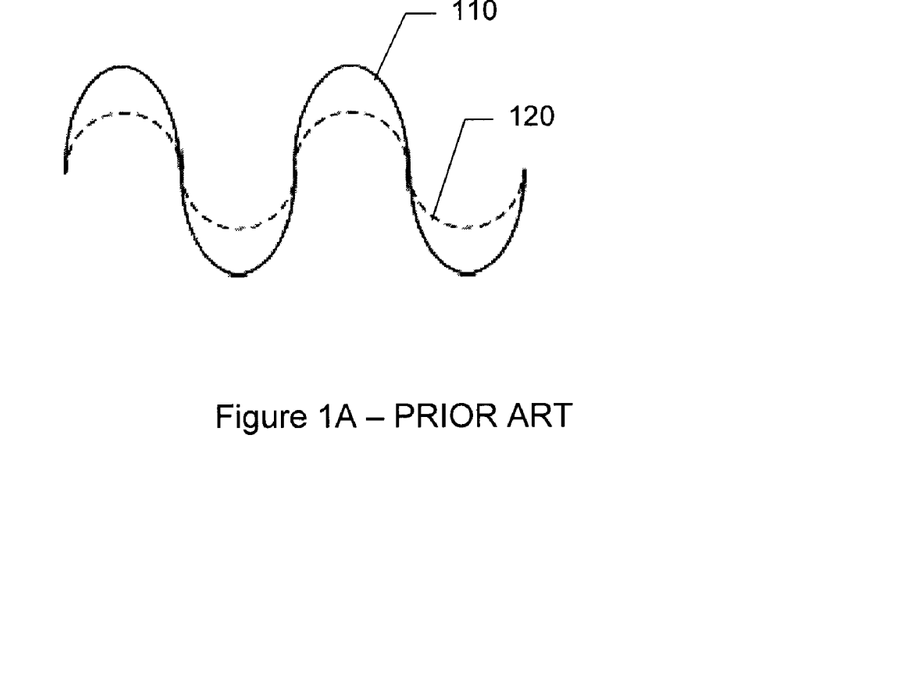
FIG. 1A is a graph illustrating in-phase voltage and current signals in a resistive circuit according to the prior art.

As shown in FIG. 1A, in an alternating current circuit, the current signal 120 will follow the voltage signal 110 if the load is simply resistive. This means that when the maximum voltage is across the load the maximum current flows. When the voltage reverses so, does the current.

Figure 1B:
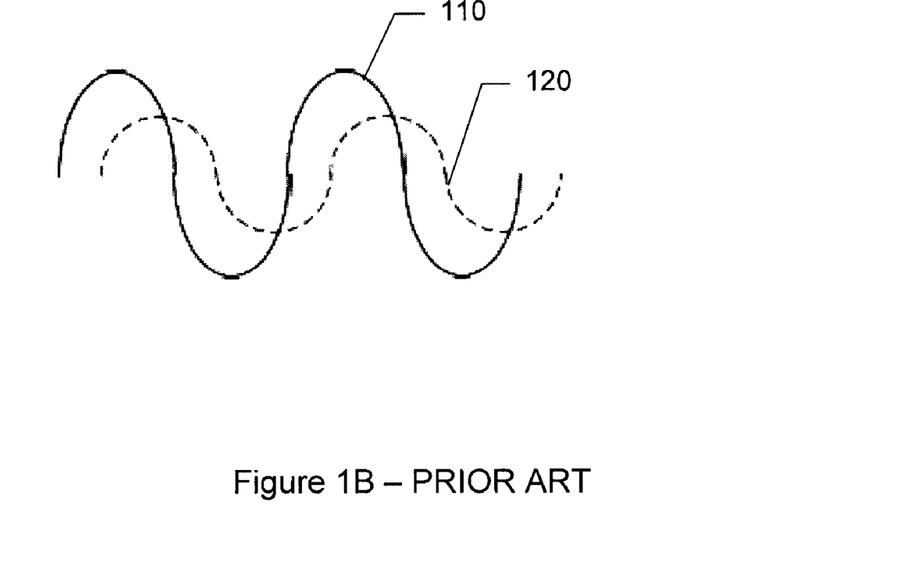
FIG. 1B is a graph illustrating out-of-phase voltage and current signals in a varying load circuit according to the prior art.

However, as shown in FIG. 1B, complex alternating current loads are not always this simplistic. In actuality the current signal 120 does not precisely follow the voltage signal 110 because the load is inductive, capacitive, or a combination which varies over time. As the complexity of the load increases, the phase displacement between the current and the voltage increases. As a result, the power factor is reduced and the power supply is less effective.

Most conventional methods of PFC use a reference to generate a current that is power factor corrected. This reference is usually obtained by multiplying a scaled replica of the rectified line voltage vg times the output of the voltage error amplifier, which sets the current reference amplitude. In this way, the reference signal is naturally synchronized and proportional to the line voltage, which is the condition needed in order to obtain unity power factor.

One conventional PFC method is peak current control. In this method the switch is turned on via a constant clock signal and is turned off when the sum of the positive ramp of the inductor current and an external ramp or compensating ramp reaches the sinusoidal current reference.

Peak current control methods typically operate in continuous current mode CCM for reduced input filter requirement. The diodes used in the diode bridge can also be slow switching diodes because the bridge diodes only need to block at line frequency. However, the freewheel diode in the boost converter needs to be fast switching.

Figure 1C:
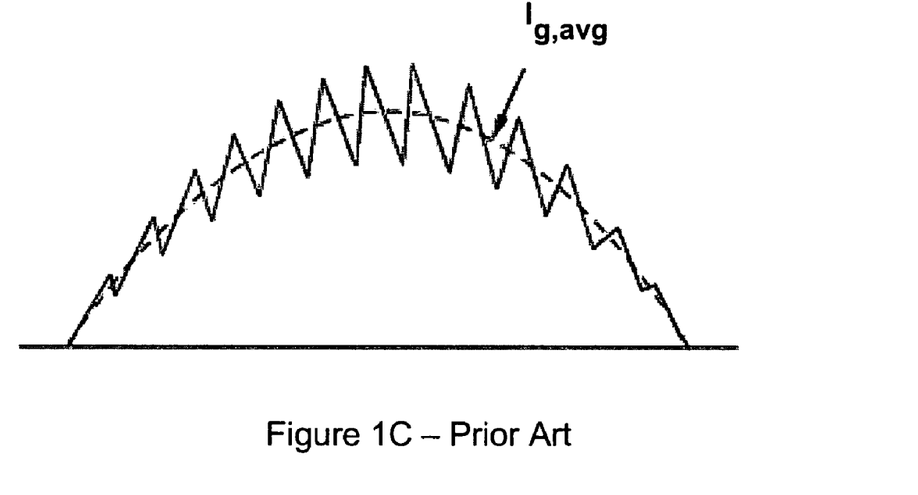
FIG. 1C is a diagram illustrating a current waveform of a conventional average current control method according to the prior art.

Refer to FIG. 1C, which is a diagram illustrating a current waveform of a conventional average current control method.

Another conventional PFC method is average current control. This method provides a better current waveform as the control is based on the average rather than the peak. The inductor current is sensed and filtered by a current error amplifier whose output drives a pulse width modulation PWM modulator. The inner current loop tends to minimize the error between the average input current and the reference. However, average current control operates on a constant switching frequency and has the same requirements for diodes as the peak current control method.

Figure 1D:
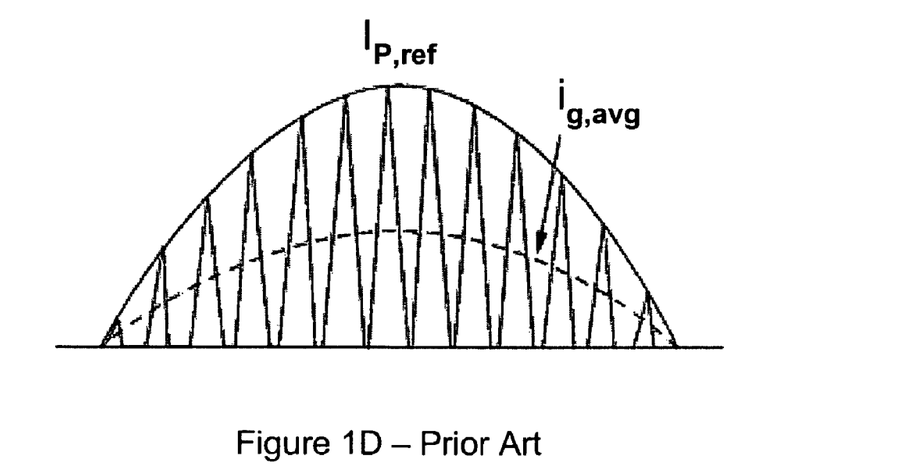
FIG. 1D is a diagram illustrating a current waveform of a conventional discontinuous current PWM control method according to the prior art.

Refer to FIG. 1D, which is a diagram illustrating a current waveform of a conventional discontinuous current PWM control method.

A third type of conventional PFC is discontinuous current PWM control. In this method the switch is operated at constant on-time and frequency without an inner current loop. With the converter working in discontinuous conduction mode DCM, this control technique allows unity power factor when used with converter topologies like flyback. However, because of the discontinuous current, this method can cause harmonic distortion in the line current.

Therefore, there is need for a reliable and efficient method of power factor correction that is utilized in a power supply or power source system.

SUMMARY OF THE INVENTION

To achieve these and other advantages and in order to overcome the disadvantages of the conventional method in accordance with the purpose of the invention as embodied and broadly described herein, the present invention provides a method of power factor correction without using current sensing or a multiplier by using a generated predictive pulse to charge and discharge a power factor correction (PFC) inductor.

The power factor is commonly defined as the ratio of total active power to total apparent power in volt-amperes. As noted, frequently the current waveform is not sinusoidal and is out of phase with the voltage. In order to overcome this issue, a current supply which provides a current waveform in phase with the voltage is required.

Active power factor correction attempts to make the input to a power supply appear like a resistor. This can be achieved by programming the input current in response to the input voltage. Maintaining the ratio between the voltage and current constant, the input will be resistive and the power factor will equal one.

In order to perform power factor correction without using current sensing or a multiplier, a generated predictive pulse is used to charge and discharge the power factor correction (PFC) inductor. This is performed in a way such that the approximate current (the peak or the average) in the PFC inductor has a substantially similar phase angle as the input AC voltage.

The generated predictive pulse has a varying duty ratio (ON time vs. OFF time). Each ON portion of the pulse is used to charge the PFC inductor current, while each OFF portion of the pulse is used to discharge the PFC inductor current.

In order to approximate an AC voltage input source, at the beginning of the voltage phase (phase at zero), the predictive pulse has a ZERO ON time, so the PFC inductor is not at all charged. As the AC voltage input source increases in phase, but still near zero, the predictive pulse has a low duty ratio (short ON time vs. OFF time), so the PFC inductor current is charged for a relative short period, and discharged for a relatively longer period. Thus resulting in a relatively small peak or average inductor current at the beginning of the input voltage phase.

As the input voltage increases in phase (time), the predictive pulse gradually increases in ON time duty (increasing ON time vs. OFF time), and as such, the PFC inductor is being charged in increasing amount and being discharged in decreasing amount per pulse. Thus resulting in an increasing peak or average inductor current, following the input AC voltage source to a sine waveform peak when the phase reaches 90 degrees.

Once the sine peak is reached, the generated predictive pulse reverses like a mirror image, where the duty ratio is reduced per each pulse (decreasing ON time vs. OFF time), such that the peak or average PFC inductor current is reduced along with the input AC voltage source, until the phase angle reaches 180 degrees, when the ON time of the predictive pulse becomes zero again. Thus a PFC inductor current approximately in phase with the input AC voltage is generated without current sensing or the use of a multiplier.

The overall duty ratio of the predictive pulse is controlled by the load demand of the PFC converter, as the higher the load, the overall predictive pulse duty ratio is increased, while at a lighter load the overall predictive pulse duty ratio is reduced. However, the aspect of varying incremental changes in the duty ratio of the predictive pulse with input AC voltage phase is maintained regardless of the load condition.

To generate the predictive pulses, the zero crossing and the peak of the AC input voltage must be detected. Upon AC zero crossing, the predictive pulse starts its increasing ON time outputs, while upon AC peak, the predictive pulse starts it's decreasing ON time. The predictive pulse can be implemented via a counter and D/A converter, and the relative ON time (Duty Ratio) of the predictive pulses is controlled by the loading of the converter.

Another object of the present invention is to provide a method of power factor correction so that the phase angle between the current and the voltage approaches zero.

Another object of the present invention is to provide a reliable and efficient method of power factor correction. A sample of the sinusoidal voltage is taken. Next, the slope of the tangent of this point on the curve of the voltage signal is determined.

From a plurality of voltage samples, a curve of the voltage signal can be determined and those values used simulate a current signal. In this way an active power factor correction technique is achieved and a current signal in phase with the voltage signal is provided.

Another object of the present invention is to provide a power factor correction method that can be easily implemented in an integrated circuit.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 2:
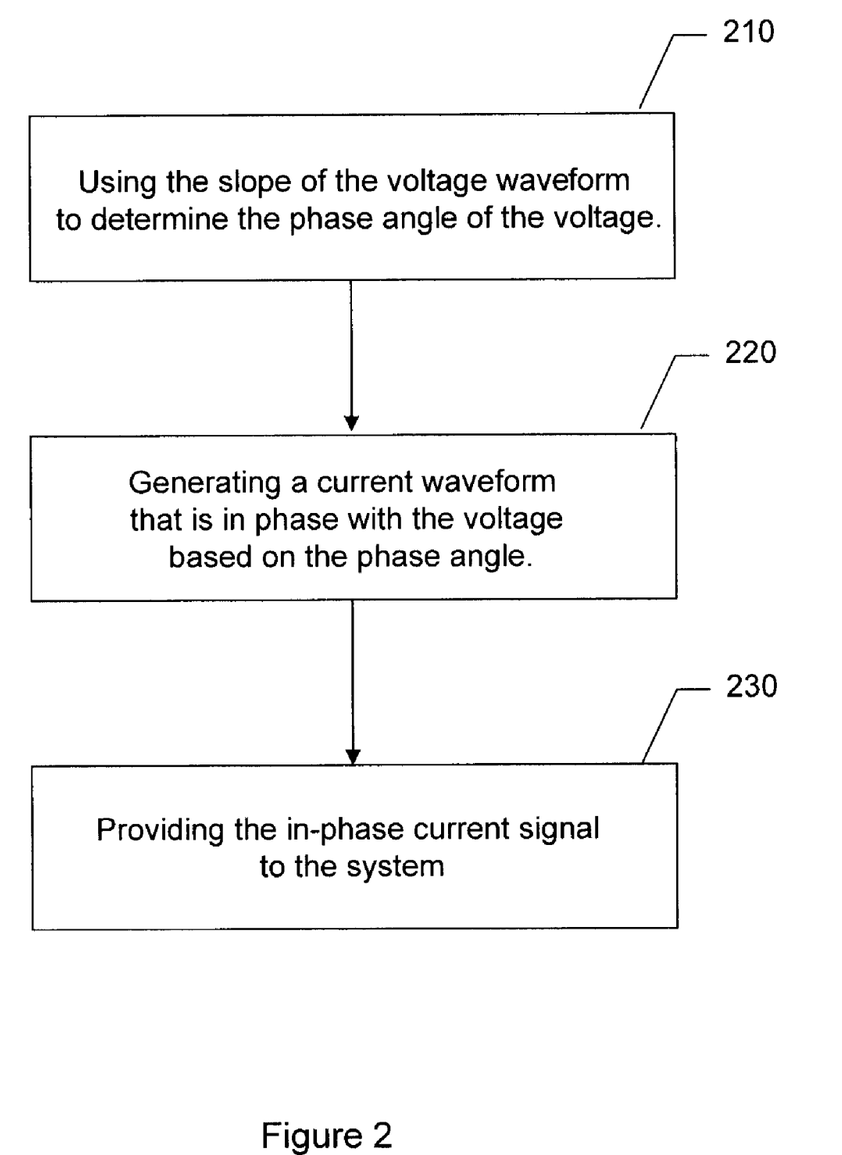
FIG. 2 is a flowchart illustrating a method of power factor correction according to an embodiment of the present invention.

Refer to FIG. 2, which is a flowchart illustrating a method of power factor correction according to an embodiment of the present invention.

As shown in FIG. 2, the method begins with Step 210 by determining the slope of the voltage waveform for a voltage sample to establish the phase angle with respect to time of the voltage waveform. From this phase angle of the voltage waveform being determined, a current waveform is generated that is in phase with the voltage (the current waveform is generated to have a phase that corresponds to the phase of the voltage waveform) in Step 220. The in-phase current waveform is then provided to the rest of the system in Step 230.

By repeating the steps above, any change in load characteristics will immediately be compensated for by the present invention in order to provide a sinusoidal current signal with zero phase displacement.

Figure 3A:
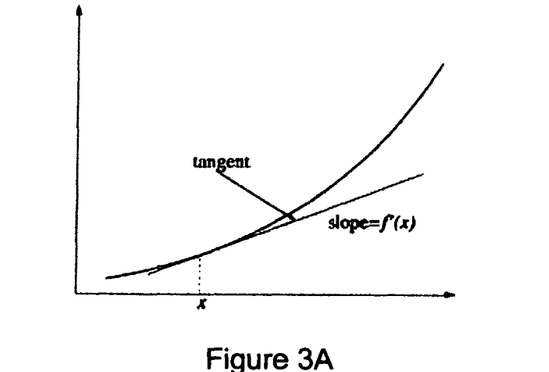
FIGS. 3A-3C are graphs illustrating determining the slope of a non-linear signal.
Figure 3B:
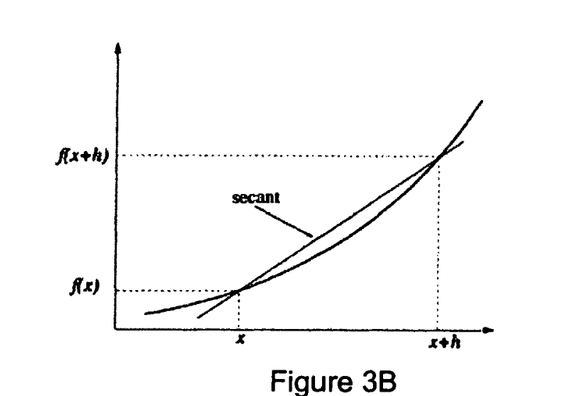
Figure 3C:
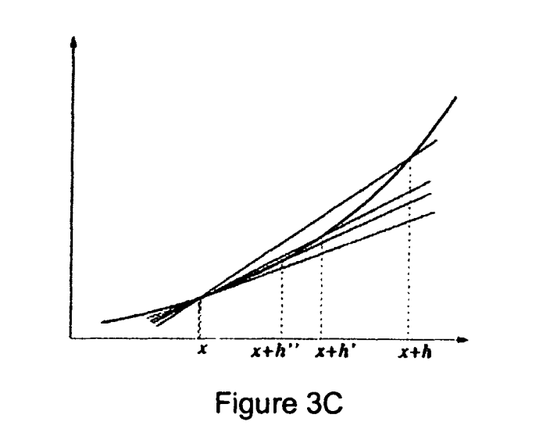

Refer to FIGS. 3A-3C, which are graphs illustrating determining the slope of a non-linear signal.

In an embodiment of the present invention the slope is determined by the following method. The derivative of a function $f$ at x is the slope of the tangent line to the graph of f $f$ at x. Since only one point is known from the sample, the tangent line is approximated with multiple secant lines. The secant lines have a progressively shorter distance between the intersecting points. The slope of the tangent line is obtained by taking the limit of the slopes of the nearby secant lines. The derivative is determined by taking the limit of the slope of secant lines as they approach the tangent line. The derivative of f at x is the limit of the value of the difference quotient as the secant lines get closer and closer to be a tangent line.

The slope of the line through the points (x, f(x)) and (x+h, f(x+h)) shown in FIG. 3C is (f(x+h)−f(x))/h.

Therefore, the slope of the voltage sample can be determined by the equation dv/dt or the derivative of voltage over the derivative of time or in other words, the derivative of voltage with respect to time.

Figure 4A:
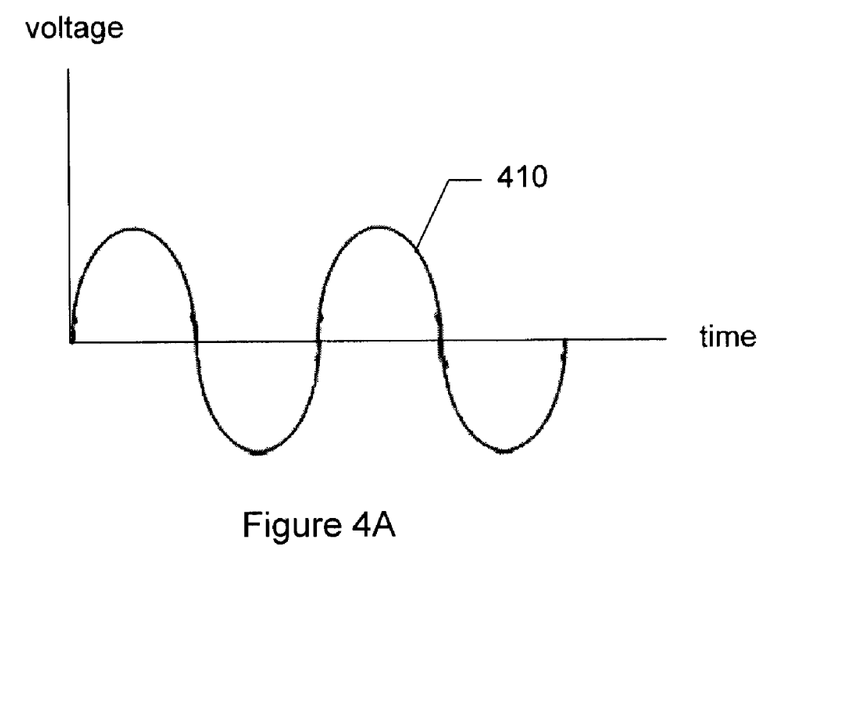
FIG. 4A is a graph illustrating a voltage signal over time.
Figure 4B:
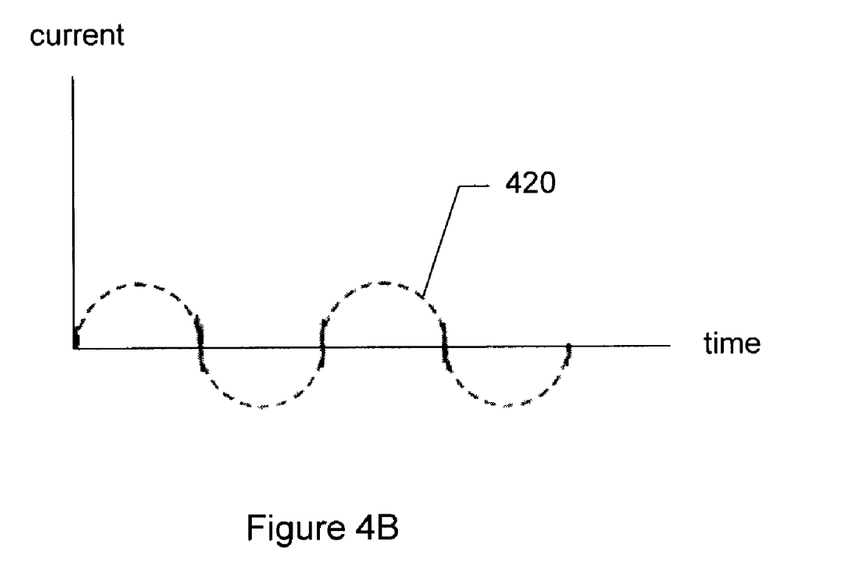
FIG. 4B is a graph illustrating a resultant current signal obtained by the method of power factor correction according to an embodiment of the present invention.

Refer to FIG. 4A which is a graph illustrating a voltage signal over time and to FIG. 4B, which is a graph illustrating a resultant current signal obtained by the method of power factor correction according to an embodiment of the present invention.

As shown in FIGS. 4A and 4B, the current signal is in-phase and in proportion to the voltage signal. The number of voltage samples can be predetermined according to requirements. In situations where high accuracy is required, more samples can be taken.

In another embodiment of the present invention the slope of the voltage signal is obtained by taking two voltage samples. Next the slope of the voltage signal is calculated as voltage at second sample minus voltage at first sample divided by time at second sample minus time at first sample.

The accuracy of the method in this embodiment is mainly dependent on the frequency of samples taken. The more frequent the samples, the more accurate the resultant current signal is.

Figure 5:
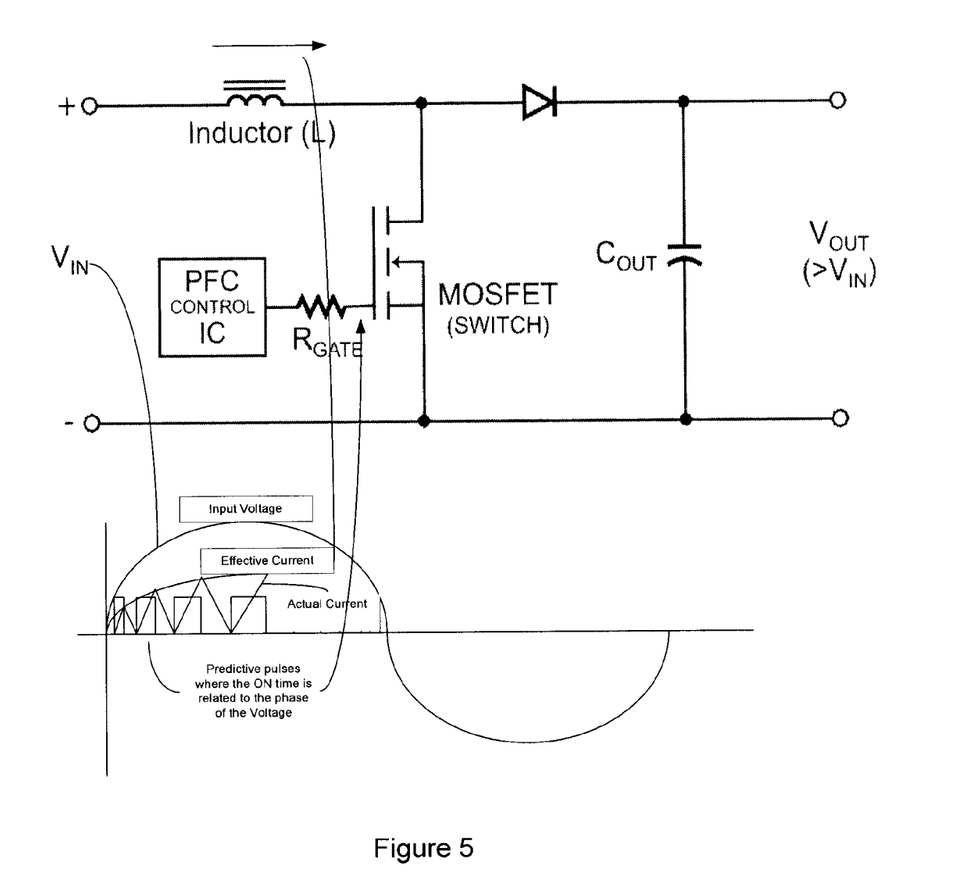
FIG. 5 is a schematic diagram illustrating a method of power factor correction without using current sensing or a multiplier according to an embodiment of the present invention.
Figure 6:
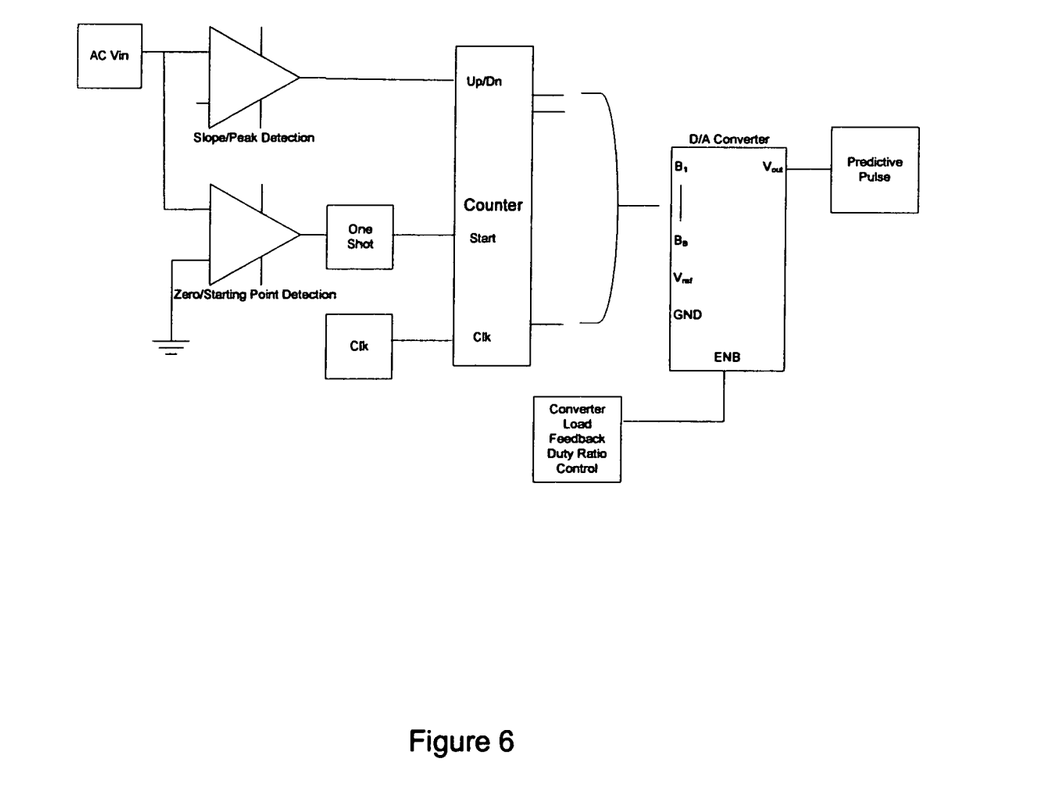
FIG. 6 is a diagram illustrating a circuit for predictive pulses according to an embodiment of the present invention.

Refer to FIG. 5, which is a schematic diagram illustrating a method of power factor correction without using current sensing or a multiplier according to an embodiment of the present invention and to FIG. 6, which is a diagram illustrating a circuit for predictive pulses according to an embodiment of the present invention.

In order to perform power factor correction without using current sensing or a multiplier, a generated predictive pulse is used to charge and discharge the power factor correction (PFC) inductor. An ON portion of the predictive pulse is used to charge the power factor correction inductor current, while an OFF portion of the predictive pulse is used to discharge the power factor correction inductor current so the approximate current (the peak or the average) in the PFC inductor has a substantially similar phase angle as the input AC voltage.

The generated predictive pulse has a varying duty ratio (ON time vs. OFF time). Each ON portion of the pulse is used to charge the PFC inductor current, while each OFF portion of the pulse is used to discharge the PFC inductor current.

In order to approximate an AC voltage input source, at the beginning of the voltage phase (phase at zero), the predictive pulse has a ZERO ON time, so the PFC inductor is not at all charged. As the AC voltage input source increases in phase, but still near zero, the predictive pulse has a low duty ratio (short ON time vs. OFF time), so the PFC inductor current is charged for a relative short period, and discharged for a relatively longer period. Thus resulting in a relatively small peak or average inductor current at the beginning of the input voltage phase.

As the input voltage increases in phase (time), the predictive pulse gradually increases in ON time duty (increasing ON time vs. OFF time), and as such, the PFC inductor is being charged in increasing amount and being discharged in decreasing amount per pulse. Thus resulting in an increasing peak or average inductor current, following the input AC voltage source to a sine waveform peak when the phase reaches 90 degrees.

Once the sine peak is reached, the generated predictive pulse reverses like a mirror image, where the duty ratio is reduced per each pulse (decreasing ON time vs. OFF time), such that the peak or average PFC inductor current is reduced along with the input AC voltage source, until the phase angle reaches 180 degrees, when the ON time of the predictive pulse becomes zero again. Thus a PFC inductor current approximately in phase with the input AC voltage is generated without current sensing or the use of a multiplier.

The overall duty ratio of the predictive pulse is controlled by the load demand of the PFC converter, as the higher the load, the overall predictive pulse duty ratio is increased, while at a lighter load the overall predictive pulse duty ratio is reduced. However, the aspect of varying incremental changes in the duty ratio of the predictive pulse with input AC voltage phase is maintained regardless of the load condition.

To generate the predictive pulses, the zero crossing and the peak of the AC input voltage must be detected. Upon AC zero crossing, the predictive pulse starts its increasing ON time outputs, while upon AC peak, the predictive pulse starts it's decreasing ON time. The predictive pulse can be implemented via a counter and D/A converter, and the relative ON time (Duty Ratio) of the predictive pulses is controlled by the loading of the converter.

Figure 7:
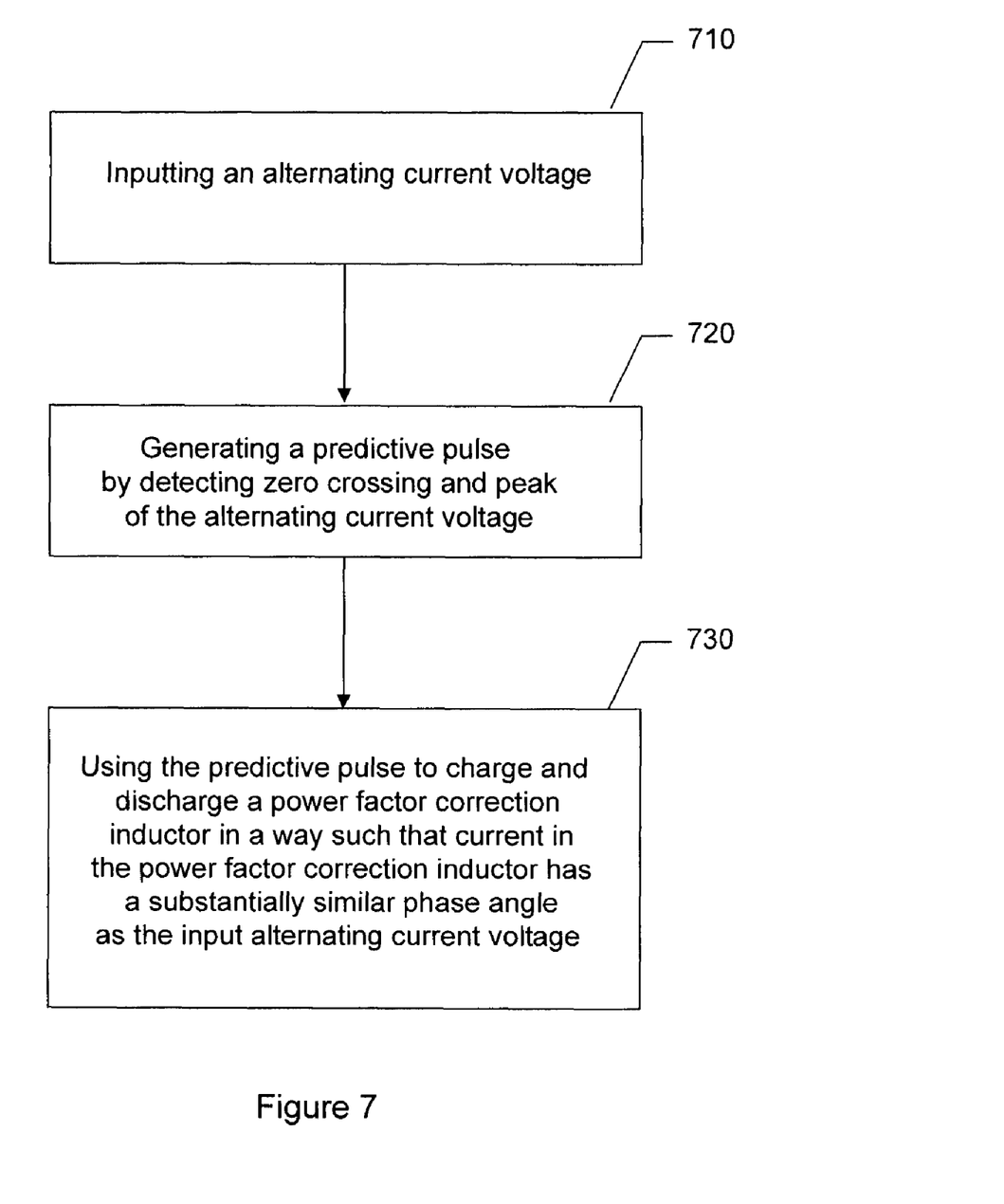
FIG. 7 is a flowchart illustrating a method of power factor correction according to an embodiment of the present invention.

Refer to FIG. 7, which is a flowchart illustrating a method of power factor correction according to an embodiment of the present invention.

The embodiment illustrated in FIG. 7 begins by inputting an AC voltage in Step 710. In Step 720 a predictive pulse is generated by detecting zero crossing and peak of the alternating current voltage. Finally, in Step 730 the generated predictive pulse is used to charge and discharge a power factor correction inductor where an ON portion of the predictive pulse is used to charge the power factor correction inductor current, while an OFF portion of the predictive pulse is used to discharge the power factor correction inductor current so that current in the power factor correction inductor has a substantially similar phase angle as the input alternating current voltage.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A method of performing power factor correction comprising:
   inputting an alternating current voltage into a power supply;
   generating a predictive pulse by detecting a zero crossing and a peak of the alternating current voltage; and
   using an ON portion of the predictive pulse to charge a power factor correction inductor and using an OFF portion of the predictive pulse to discharge the power factor correction inductor so that current in the power factor correction inductor has a substantially similar phase angle as the input alternating current voltage.

2. The method of claim 1, wherein the predictive pulse has a varying duty ratio of ON time versus OFF time.

3. The method of claim 1, wherein the power factor correction inductor is uncharged when voltage phase of the alternating current voltage is zero and the predictive pulse has a zero ON time.

4. The method of claim 1, wherein as the alternating current voltage input increases in phase but still near zero the predictive pulse has a short ON time versus OFF time so the power factor correction inductor current is charged for a relative short period and discharged for a relatively longer period.

5. The method of claim 1, wherein as the input alternating current voltage increases in phase the predictive pulse gradually increases in ON time duty the power factor correction inductor is being charged in increasing amount and being discharged in decreasing amount per pulse.

6. The method of claim 1, wherein once peak alternating voltage is reached duty ratio of the predictive pulse is reduced per each pulse such that the power factor correction inductor current is reduced along with the input alternating current voltage until the phase angle reaches 180 degrees and the ON time of the predictive pulse becomes zero.

7. The method of claim 1, wherein the power factor correction inductor current is approximately in phase with the input alternating current voltage.

8. The method of claim 1, wherein the power factor correction inductor current is generated without current sensing or use of a multiplier.

9. The method of claim 1, wherein overall duty ratio of the predictive pulse is controlled by load demand of a power factor correction converter with high loads increasing predictive pulse duty ratio and lighter loads reducing predictive pulse duty ratio.

10. The method of claim 1, wherein upon an alternating current voltage zero crossing the predictive pulse starts increasing ON time outputs.

11. The method of claim 1, wherein upon an alternating current voltage peak the predictive pulse starts decreasing ON time outputs.

12. The method of claim 1, wherein the ON time of the predictive pulse is controlled by loading of a converter.

13. A method of performing power factor correction comprising:
  inputting an alternating current voltage into a power supply;
  generating a predictive pulse by detecting a zero crossing and a peak of the alternating current voltage, the predictive pulse having a varying duty ratio of ON time versus OFF time; and
  using an ON portion of the predictive pulse to charge a power factor correction inductor and using an OFF portion of the predictive pulse to discharge the power factor correction inductor so that current in the power factor correction inductor has a substantially similar phase angle as the input alternating current voltage.

14. The method of claim 13, wherein the power factor correction inductor is uncharged when voltage phase of the alternating current voltage is zero and the predictive pulse has a zero ON time.

15. The method of claim 13, wherein as the alternating current voltage input increases in phase but still near zero the predictive pulse has a short ON time versus OFF time so the power factor correction inductor current is charged for a relative short period and discharged for a relatively longer period.

16. The method of claim 13, wherein as the input alternating current voltage increases in phase the predictive pulse gradually increases in ON time duty the power factor correction inductor is being charged in increasing amount and being discharged in decreasing amount per pulse.

17. The method of claim 13, wherein once peak alternating voltage is reached duty ratio of the predictive pulse is reduced per each pulse such that the power factor correction inductor current is reduced along with the input alternating current voltage until the phase angle reaches 180 degrees and the ON time of the predictive pulse becomes zero.

18. The method of claim 13, wherein the power factor correction inductor current is approximately in phase with the input alternating current voltage.

19. The method of claim 13, wherein the power factor correction inductor current is generated without current sensing or use of a multiplier.

20. The method of claim 13, wherein overall duty ratio of the predictive pulse is controlled by load demand of a power factor correction converter with high loads increasing predictive pulse duty ratio and lighter loads reducing predictive pulse duty ratio.

21. The method of claim 13, wherein upon an alternating current voltage zero crossing the predictive pulse starts increasing ON time outputs.

22. The method of claim 13, wherein upon an alternating current voltage peak the predictive pulse starts decreasing ON time outputs.

23. The method of claim 13, wherein the ON time of the predictive pulses is controlled by loading of a converter.

24. A method of performing power factor correction comprising:
  inputting an alternating current voltage into a power supply;
  generating a predictive pulse by detecting a zero crossing and a peak of the alternating current voltage, the predictive pulse having a varying duty ratio of ON time versus OFF time; and
  using the predictive pulse to charge and discharge a power factor correction inductor so that current in the power factor correction inductor has a substantially similar phase angle as the input alternating current voltage, wherein an ON portion of the predictive pulse is used to charge the power factor correction inductor current, while an OFF portion of the predictive pulse is used to discharge the power factor correction inductor current; and
  wherein the power factor correction inductor is uncharged when voltage phase of the alternating current voltage is zero and the predictive pulse has a zero ON time.

25. The method of claim 24, wherein as the alternating current voltage input increases in phase but still near zero the predictive pulse has a short ON time versus OFF time so the power factor correction inductor current is charged for a relative short period and discharged for a relatively longer period.

26. The method of claim 24, wherein as the input alternating current voltage increases in phase the predictive pulse gradually increases in ON time duty the power factor correction inductor is being charged in increasing amount and being discharged in decreasing amount per pulse.

27. The method of claim 24, wherein once peak alternating voltage is reached duty ratio of the predictive pulse is reduced per each pulse such that the power factor correction inductor current is reduced along with the input alternating current voltage until the phase angle reaches 180 degrees and the ON time of the predictive pulse becomes zero.

28. The method of claim 24, wherein the power factor correction inductor current is approximately in phase with the input alternating current voltage.

29. The method of claim 24, wherein the power factor correction inductor current is generated without current sensing or use of a multiplier.

30. The method of claim 24, wherein overall duty ratio of the predictive pulse is controlled by load demand of a power factor correction converter with high loads increasing predictive pulse duty ratio and lighter loads reducing predictive pulse duty ratio.

31. The method of claim 24, wherein upon an alternating current voltage zero crossing the predictive pulse starts increasing ON time outputs.

32. The method of claim 24, wherein upon an alternating current voltage peak the predictive pulse starts decreasing ON time outputs.

33. The method of claim 24, wherein the ON time of the predictive pulse is controlled by loading of a converter.

* * * * *